Jan. 16, 1962 R. E. LAWRENCE 3,016,798
COMPACT ACHROMATIC TELESCOPE LENS
Filed Oct. 9, 1958 2 Sheets-Sheet 1

INVENTOR.
ROBERT E. LAWRENCE
BY
J. M. St. Amand
ATTORNEYS.

United States Patent Office 3,016,798
Patented Jan. 16, 1962

3,016,798
COMPACT ACHROMATIC TELESCOPE LENS
Robert E. Lawrence, China Lake, Calif., assignor to the United States of America as represented by the Secretary of the Navy
Filed Oct. 9, 1958, Ser. No. 766,365
3 Claims. (Cl. 88—57)
(Granted under Title 35, U.S. Code (1952), sec. 266)

The invention described herein may be manufactured and used by or for the Government of the United States of America for governmental purposes without the payment of any royalties thereon or therefor.

The present invention relates to an optical lens system and more particularly to a compact achromatic telescope lens with low T-number and having minimum spherical aberration.

Similar lens systems most commonly used are of the simple Cassegrainian type with spherical surfaces, and when used at relatively wide apertures, such as in the region of f/1.0, a spherical dome was frequently used as a corrector for the spherical aberration present in the telescope. In general, the thickness (i.e., the length) of the telescope in prior lens systems was not of great consideration, and the primary mirror of the telescope was frequently placed near the center of curvature of the spherical dome. A reticle is generally used at the focal plane of this type lens system. In these prior lens systems of the simple Cassegrainian type elaborate sunshades were required, which frequently were attached to the secondary mirror to protect the reticle from light outside the field of view; such mounting of the secondary mirror and the sunshade may be moderately expensive. Also, for telescopes that are small relative to the spherical dome, excessive dome thicknesses are required to neutralize the spherical aberration; this as well as "Mangin" primary or secondary mirrors, alone, would introduce chromatic aberration, and use of aspheric mirrors would be more expensive.

The lens system of the present invention overcomes the aforesaid disadvantages of the prior lens systems. The present lens system occupies a minimum thickness while maintaining a relatively large light collecting area, and does not allow stray light outside the field of view to pass through a reticle at the focal plane. The resolution of the present lens is adequate to produce a blur circle of 2 milliradians or less for point sources near the center of the field. This improved lens system uses an objective system mounted behind a spherical dome and has a unique sunshade arrangement. The shape and arrangement of the telescope elements neutralize spherical and chromatic aberrations.

It is an object of the invention therefore to provide a compact achromatic telescope lens with low T-number and minimum spherical aberration;

Another object of the invention is to provide an optical telescope system which is of extremely short length and which neutralizes spherical and chromatic aberration;

A further object of the invention is to provide a compact achromatic telescope lens system of the Cassegranian type with a unique sunshade arrangement which will not allow stray light outside the field of view to reach a reticle positioned at the focal plane.

Other objects and many of the attendant advantages of this invention will be readily appreciated as the same becomes better understood by reference to the following detailed description when considered in connection with the accompanying drawings wherein.

Referring now to the drawings, like numerals refer to like parts in each of the figures. The planar view, not shown, of substantially all parts is circular.

Figure 1:
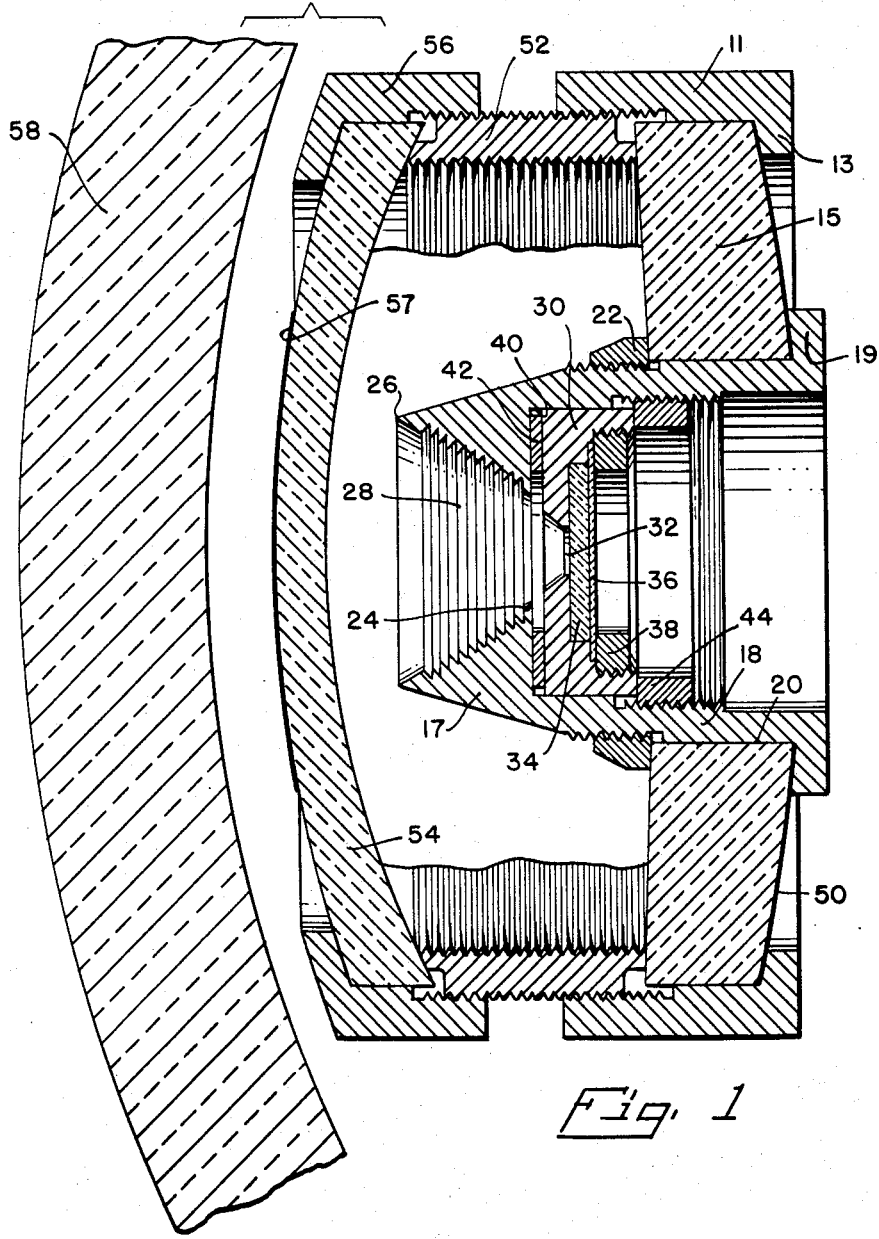
FIG. 1 is a cross-sectional side view of the compact telescope lens system of the present invention.

The lens assembly, as illustrated in FIG. 1 has, as a portion thereof, a cylindrical ring 11 as a rear lens holder, which is also used for supporting the lens assembly. Cylindrical ring 11 has an inwardly extending flange 13 around the lower periphery thereof, for supporting rear lens 15. A reticle shade 17 has a hollow cylindrical portion 18 having an outwardly extending flange 19 about the lower end thereof. The cylindrical portion 18 has an outside diameter equal to the diameter of central aperture 20 in rear lens 15. Reticle shade 17 is supported by rear lens 15. Cylindrical portion 18 of the reticle shade fits within aperture 20 in rear lens element 15 with flange 19 bearing against the rear side of lens element 15. A retaining ring 22, threads onto the upper outer portion of cylinder portion 18 of the reticle shade to bear against the front side of lens 15 and firmly holds the reticle shade in place within aperture 20.

The forward portion of reticle shade 17 tapers somewhat inwardly about the outer periphery thereof, and tapers outwardly from a central aperture 24 therein to where the two conical tapering surfaces intersect forming a circular edge 26. Circular edge 26 has a diameter less than the diameter of lens aperture 20 and greater than the diameter of central aperture 24 of the reticle shade. The inner conical surface 28 between central aperture 24 and circular edge 26 is provided with light diffusing grooves which trap spurious light rays preventing them from passing through aperture 24.

A reticle holder 30, having an aperture 32 in the forward end thereof and having a reticle 34 and filter 36 retained therein by means of a reticle retaining ring 38 directly behind aperture 32, fits within a cavity 40 directly behind central aperture 24 in the forward end of reticle shade 17. Reticle holder 30 has a flat ring-shaped focusing shim 42 positioned between the forward end of reticle holder 30 and the inner surface at the rear side of central aperture 24. Focusing shim 42 and reticle holder 30 together with its reticle 34 and filter 36 are firmly mounted within cavity 40 by means of reticle holder retaining ring 44.

The rear side of rear lens 15 has a mirrored surface 50. Rear lens 15 is supported by rear lens holder 11 with the rear surface 50 thereof against flange 13. A hollow cylindrical shaped lens spacer 52, which is threaded on its interior and exterior surfaces, threadedly fits within the inner forward end of rear lens holder 11 for retaining rear lens 15 within the rear lens holder. The threads on the inner surface of lens spacer 52 act as traps for absorbing spurious light rays. A portion of lens spacer 52 extends forward of the forward portion of rear lens holder 11. A front lens 54 is mounted over the forward end of lens spacer 52 and is held in place by means of a front lens holder 56, which is somewhat similar in shape to rear lens holder 11, but shorter in length or thickness.

Front lens 54 has a central portion 57 of the forward side thereof mirrored. This mirrored area 57 is slightly greater in diameter than the diameter of aperture 20 in rear lens 15. An optical dome 58 may be positioned in front of the lens assembly. The reflective side of mirrored surfaces 50 and 57, in either case, face the lens element 15 or 54, respectively. The non-reflective side of mirrored area 57, i.e., the side which faces dome 58, may be coated black to minimize light reflections.

Figure 2:
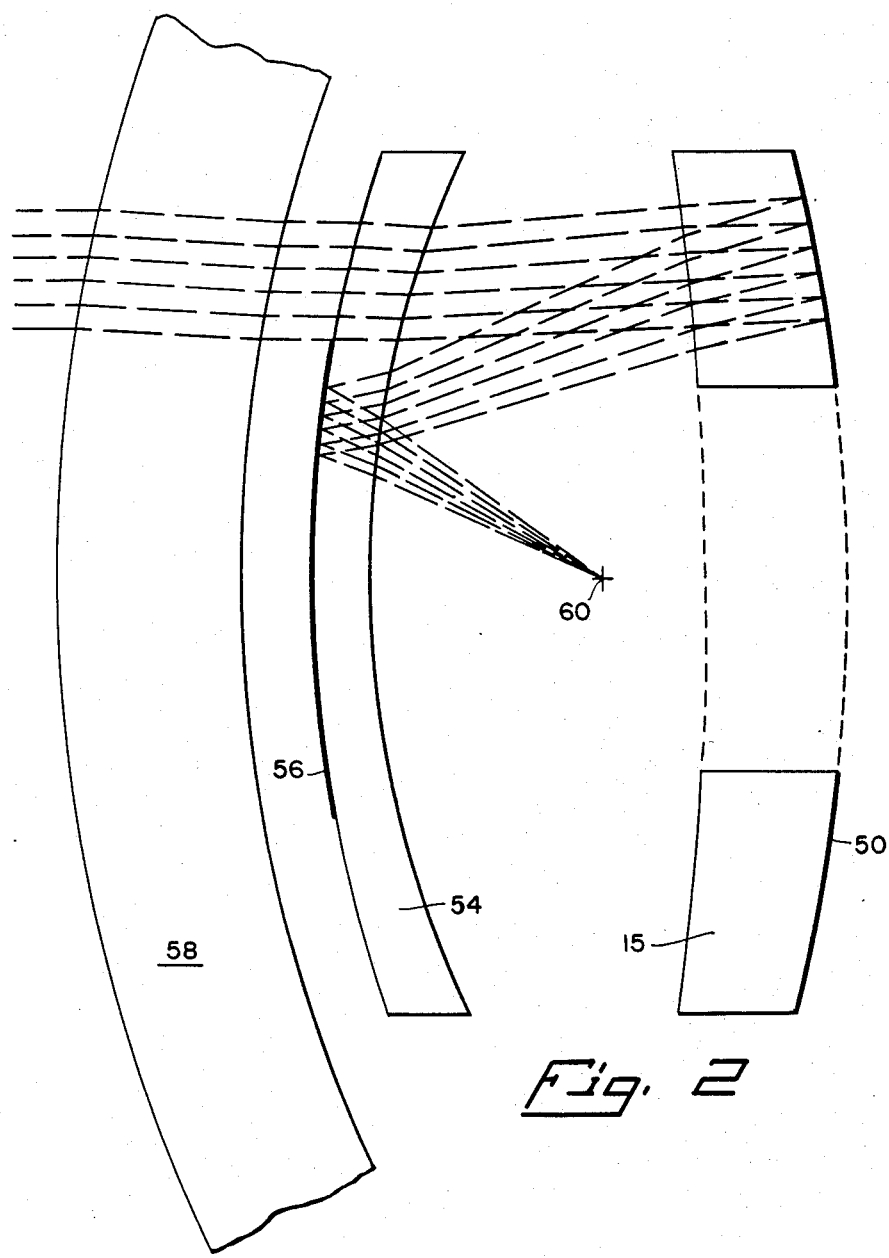
FIG. 2 is a sketch illustrating the light path through the lens system.

In FIG. 2 is illustrated the path of light rays in the telescope. Light may pass through transparent optical dome 58 and then through front lens 54 except where covered by mirrored area 57. After passing through lens 54, light rays pass through rear lens 15 and are reflected by the mirrored rear surface 50. Light rays reflected by mirrored surface 50 are focused onto mirrored surface 57 after again passing through rear lens 15 and front lens 54. The light rays are then reflected off front mirrored surface 57 and focused to focal point 60 where the reticle 34 is generally positioned.

Both the primary and secondary mirrors, the rear lens and front lens respectively, are rear surfaces to assist in achieving compactness. To further aid in compactness the front lens 54 may be concentric with dome 58, and dome 58 may serve as a partial corrector for spherical aberration. However, it is not mandatory that front lens 54 be concentric with dome 58, nor is it necessary to use a dome at all. The secondary mirror, mirrored surface 57 on front lens 57, together with reticle shade 17 serves as a very efficient sun shade, since light rays cannot pass through the mirrored surface which is opaque.

In the present lens system the focal plane falls well within the volume of the system, allowing room therein for reticle 34 and a photodetector behind the reticle, as desired. The radii of curvature, thickness, and separation of the two lens elements are chosen to simultaneously reduce to a minimum the spherical and chromatic aberrations for the system. Identical optical glass may be used for all lens elements in the system, however, this is not a requirement. A primary feature in the present lens system is that the shapes of the lens elements are such that spherical aberration introduced by the reflective surfaces is neutralized by the spherical aberration introduced by the refractive surfaces; and further, the chromatic aberrations introduced by the various refractive surfaces neutralize each other. Also, the entire lens system, excluding the dome if used, is capable of being gyroscopically mounted for rotation with the optical axis coinciding with the gyroscope spin axis.

Obviously, many modifications and variations of the present invention are possible in the light of the above teachings. It is therefore to be understood that within the scope of the appended claims the invention may be practiced otherwise than as specifically described.

What is claimed is:

1. A compact achromatic telescope lens system, comprising a front lens element and a rear lens element, a spacer member between said front and rear lens elements, a front lens holder for edge mounting said front lens element in place on the front side of said spacer member, a rear lens holder for edge mounting said rear lens element in place on the rear side of said spacer member, the rear side of said rear lens element and the central portion of the front side of said front lens element having mirrored surfaces facing the lens elements and forming primary and secondary mirrors respectively, said rear lens element having a large central aperture therethrough, a reticle shade mounted in said aperture in the rear lens, the forward portion of said reticle shade extending into the space between said front and rear lens elements, a reticle holder mounted in said reticle shade, a reticle mounted in said reticle holder, the portion of said front lens element not having a mirrored surface being operable to allow light rays to pass therethrough to said rear lens element, the primary mirror on the rear surface of said rear lens element being operable to reflect said light rays to the secondary mirror on the central portion of said front lens element, said secondary mirror being operable to reflect said light rays to the reticle, said reticle being substantially in the focal plane of the lens system formed by said front and rear lens elements and mirrors and located wholly within the space between said lens elements, the forward portion of said reticle shade together with the central mirrored portion on said front lens element forming a light shade which is operable to prevent light other than that reflected by the primary and secondary mirrors from impinging on said reticle.

2. A compact achromatic lens assembly comprising a first cylindrical ring having an inwardly extending flange and an inner threaded portion; a rear lens element positioned within said ring and in engagement with said flange; a hollow cylindrical member externally threaded and threadedly engaged with said ring, said member engaging said lens element; a second cylindrical ring having an inwardly extending flange and an inner threaded portion; a front lens element, said front lens element positioned within said second ring and in engagement with the flange thereof; said member threadedly engaged with said second ring and engaging said front lens element, said member serving to space said lens elements and retain them in said rings; said rear lens element having a central aperture and a mirror-surfaced rear side; a reticle support means having a cylindrical portion positioned within said aperture and a shade portion extending into the space between said lens elements; a reticle and filter mounted in said support means and located between said lens elements; said shade portion having inner and outer tapering surfaces which meet in an outer circular edge; and said front lens element having the central portion of its forward side mirror-surfaced, said central portion having a diameter greater than said central aperture of the rear lens element, and said central aperture having a diameter greater than the diameter of said circular edge.

3. A lens system for minimizing spherical and chromatic aberrations, said system comprising a front lens element and a rear lens element; said front lens element and said rear lens element mounted in spaced relationship and their optic axes coinciding; said rear lens element having a mirrored surface forming a primary mirror on the rear side thereof and having a large central aperture therethrough; said front lens element having a mirrored surface forming a secondary mirror on the central portion of the front side thereof larger in diameter than said central aperture of the rear lens; whereby light rays pass through the portion of the front lens element surrounding the central mirrored surface of said front lens to the primary mirror on the rear surface of said rear lens element which reflects said light rays to the secondary mirror on the central portion of said front lens element, which in turn reflects said light rays to a focal plane of the lens system located in the space between said front and rear lens elements.

References Cited in the file of this patent

UNITED STATES PATENTS

| | | |
|---|---|---|
| 2,336,379 | Warmisham | Dec. 7, 1943 |
| 2,670,656 | Braymer | Mar. 2, 1954 |
| 2,730,926 | Back et al. | Jan. 17, 1956 |

FOREIGN PATENTS

| | | |
|---|---|---|
| 476,147 | Great Britain | Dec. 2, 1937 |